United States Patent [19]

Shiratsuchi

[11] Patent Number: 4,556,119
[45] Date of Patent: Dec. 3, 1985

[54] MOTORCYCLE STRUCTURE

[75] Inventor: Kouji Shiratsuchi, Saitama, Japan

[73] Assignee: Honda Giken Kogyo Kabushiki Kaisha, Tokyo, Japan

[21] Appl. No.: 668,680

[22] Filed: Nov. 5, 1984

Related U.S. Application Data

[63] Continuation of Ser. No. 412,571, Aug. 30, 1982, abandoned.

[30] Foreign Application Priority Data

Sep. 4, 1981 [JP] Japan ................................ 56-138612

[51] Int. Cl.⁴ .............................................. B62K 25/26
[52] U.S. Cl. .................................... 180/219; 180/227; 280/284
[58] Field of Search ................ 180/219, 227, 68.5; 280/284, 285, 286, 288

[56] References Cited

U.S. PATENT DOCUMENTS

| | | | |
|---|---|---|---|
| 4,058,181 | 11/1977 | Buell | 180/227 |
| 4,076,271 | 2/1978 | Doncque | 280/284 |
| 4,327,930 | 5/1982 | Tominaga et al. | 180/227 X |
| 4,360,214 | 11/1982 | Isono | 280/284 |
| 4,408,674 | 10/1983 | Boyesen | 180/227 |
| 4,412,597 | 11/1983 | Aiba | 180/291 |
| 4,415,057 | 11/1983 | Yamaguchi | 280/284 X |

FOREIGN PATENT DOCUMENTS

| | | | |
|---|---|---|---|
| 3232654 | 3/1983 | Fed. Rep. of Germany | 180/227 |
| 436676 | 6/1948 | Italy | 280/285 |
| 453595 | 12/1949 | Italy | 280/285 |
| 455765 | 3/1950 | Italy | 280/288 |

Primary Examiner—Joseph F. Peters, Jr.
Assistant Examiner—Mitchell J. Hill
Attorney, Agent, or Firm—Lyon & Lyon

[57] ABSTRACT

A motorcycle frame and suspension system employing a backbone frame member extending rearwardly over an engine and then downwardly where it is associated with an inverted U-shaped center frame. Two pivot mechanisms for a rear fork are positioned in line with the ends of the inverted U-shape center frame and a cushion member is located therebetween. The cushion member is linked at its first end with the middle of the center frame and at its second end to a linkage mechanism fixed to move with the upward pivotal motion of the rear fork. The mechanism is so proportioned as to provide an increasing rate of upward motion to the cushion member as the rear fork moves upwardly. The two pivot mechanisms are not identical, one allowing axial sliding movement and the other not allowing such movement.

2 Claims, 3 Drawing Figures

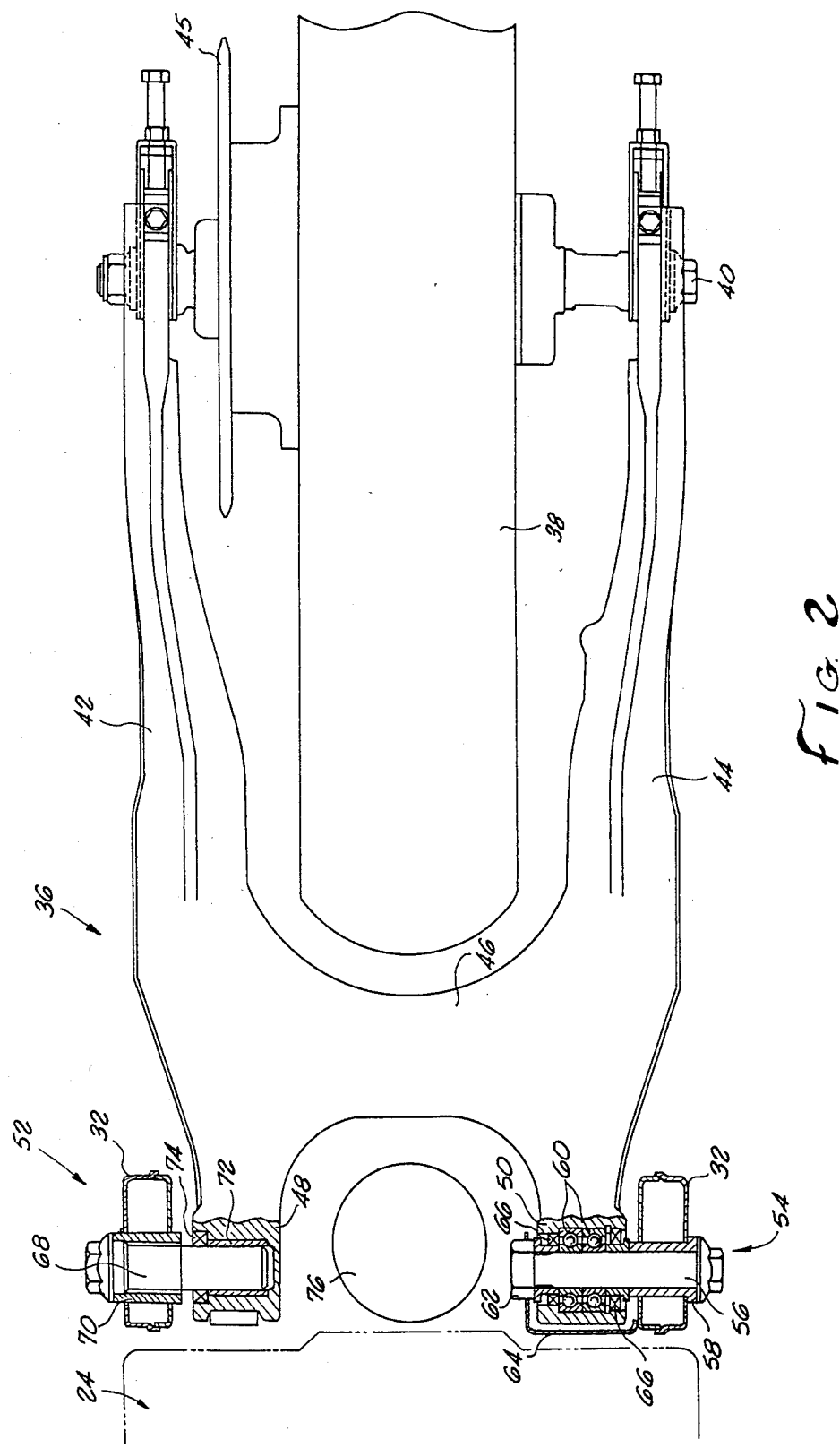

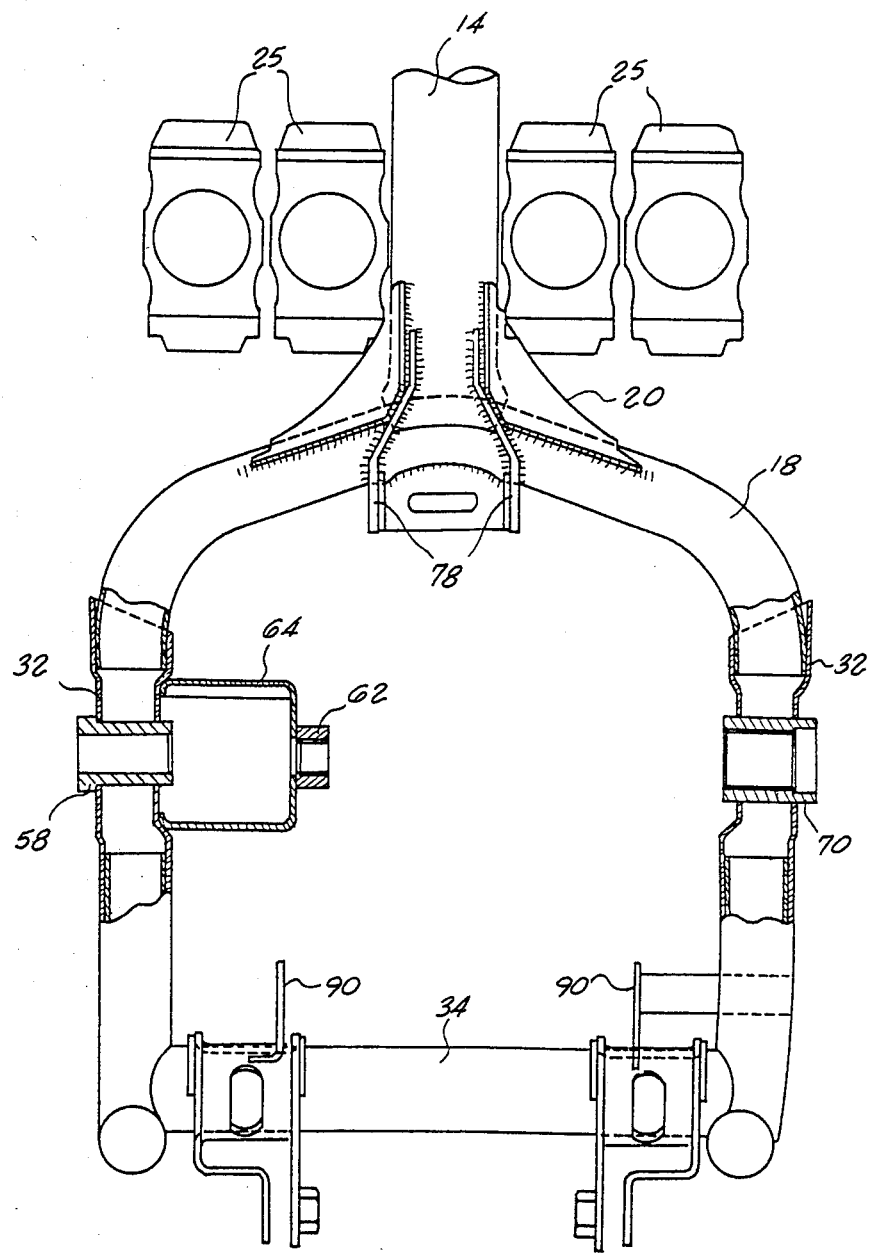

MOTORCYCLE STRUCTURE

This application is a continuation of application Ser. No. 412,571, filed Aug. 30, 1982, now abandoned.

BACKGROUND OF THE INVENTION

The scope of the present invention is motorcycle frame layout and suspension structure.

Motorcycles are designed today to be as compact and lightweight as practical in the face of many competing requirements. In the area of frame and suspension requirements, the location of cushion members such as spring and damping units has been the subject of a continuing effort at compromise and study. Closely related thereto is the design of frame members for supporting the various components of the motorcycle and rigidly accommodating the forces subjected thereon by the suspension system and cushion members. Efforts have been made to locate such cushioning members inwardly on the motorcycle in the area between the engine and the rear wheel. However, such devices have interfered with such essential factors as fuel tank location, tank capacity, air cleaner and electrical accessory space and the like and have inevitably resulted in compromise in design. Furthermore, such inboard cushioning systems have generally required extension of the wheel base to accommodate all components including cushion members. Extension of the wheel base results in unwanted additional overall weight and the necessity for additional structural rigidity. Frame systems requiring additional structural rigidity often require interference with the access to and removal of components of the motorcycle, particularly the engine. Thus, additional compromise is often required.

Additionally, difficulties have been experienced in the fabrication of suspension systems capable of withstanding the loads imposed and the number of cycles experienced over the life of a motorcycle. Increased loading can be experienced in inboard cushioning systems because of the short moment arm distances through which the cushion member acts. As a result, careful alignment of the components and close tolerances have been required, particularly in the area of the pivot mechanism for a pivoted trailing rear fork system employing inboard cushioning mechanisms.

SUMMARY OF THE INVENTION

The present invention is directed to a motorcycle structure for accommodating a centrally placed cushion member of the type providing resilient resistance and/or damping to the upward motion of a rear fork. The structure includes a single backbone frame member which extends rearwardly from a head pipe and then downwardly behind the engine to an inverted U-shaped center frame. The U-shaped center frame is generally in alignment with the downward extension of the backbone frame member and provides a position for a centrally positioned cushion member.

The orientation of the structure of the present invention enables free access to and space for the engine, the carburetion, the gas tank and electrical systems. Additionally, an improved mounting arrangement may be embraced with broadly based support for a pivotally mounted rear fork. Furthermore, the orientation of the frame with the subsequent orientation of the cushion member allows the wheel base of the motorcycle to be shortened.

Accordingly, it is the principal object of the present invention to provide an improved structural arrangement for a motorcycle. Other and further objects and advantages will appear hereinafter.

BRIEF DESCRIPTION OF THE DRAWINGS

FIG. 2 is a schematic plan view of the layout of the pivot mechanisms and rear fork of a motorcycle embodying the present invention.

FIG. 3 is a view of the frame of a motorcycle embodying the present invention looking forward on the motorcycle of FIG. 1 from behind the pivot axis of the rear suspension.

DETAILED DESCRIPTION OF THE PREFERRED EMBODIMENT

Figure 1:
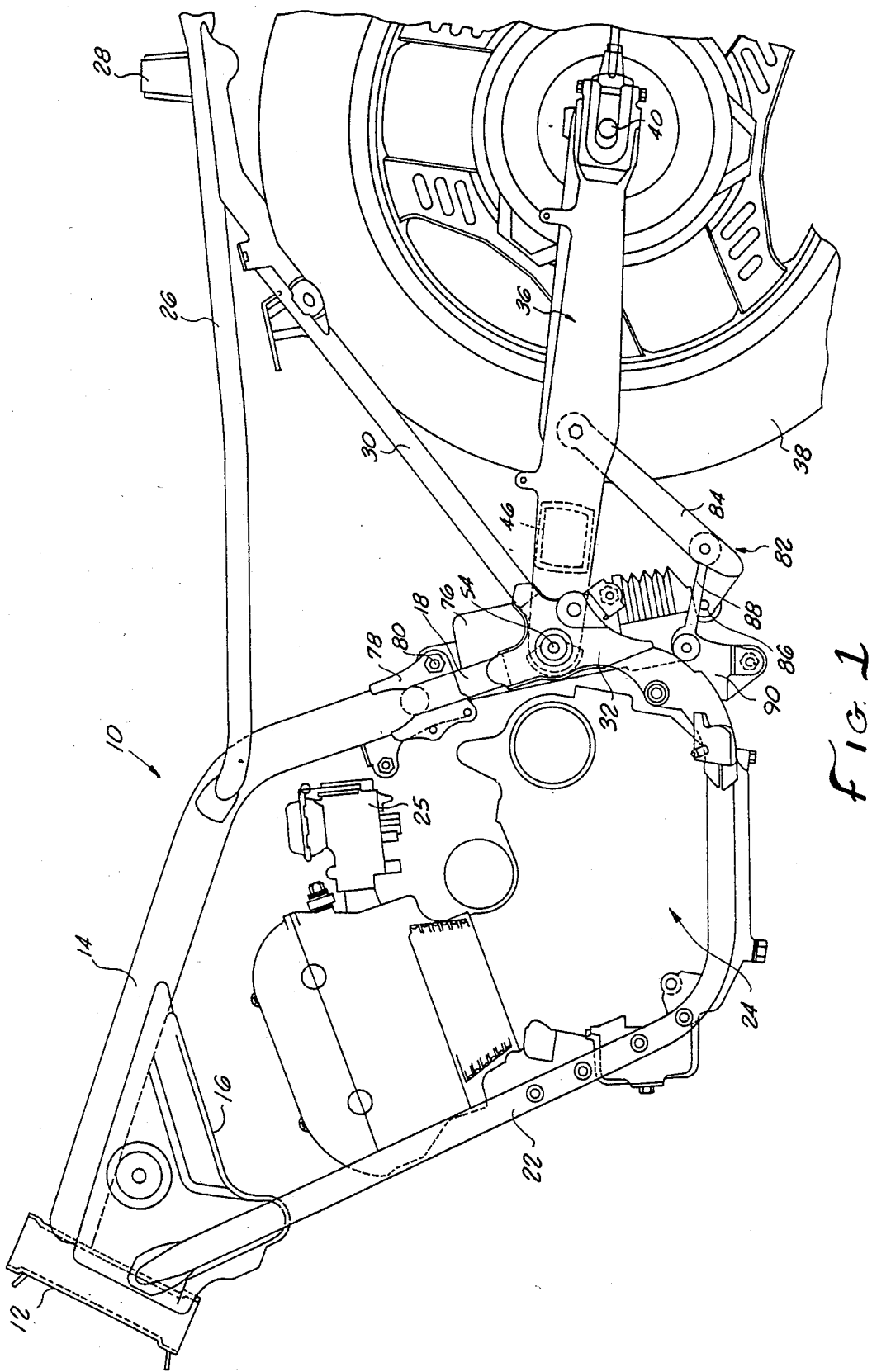
FIG. 1 is a side view of a motorcycle employing the present invention.

Turning in detail to the drawings, FIG. 1 illustrates a cradle type frame, generally designated 10, for a motorcycle. The frame is constructed to include a head pipe 12 in which is pivotally mounted the steering shaft of a front wheel, not shown. Extending rearwardly from the head pipe 12 is a backbone frame member 14. The backbone frame member 14 is made of a pipe having a relatively large diameter and is bent to form two segments. The first of the two segments extends rearwardly over the engine, schematically illustrated as 24, and the second of the two segments depends downwardly behind the engine 24 and the carburetors 25 as can best be seen in FIG. 1. Gusseting 16 gives added strength to the structure of the head pipe 12 and the backbone frame member 14.

A center frame 18 is rigidly fixed to the backbone frame member 14 at the back end thereof. This center frame 18 extends downwardly in alignment with the second segment of the backbone frame member 14 and is formed in an inverted U-shaped configuration. The joinder of the backbone frame member 14 and the center frame 18 may be seen both in FIG. 1 and in FIG. 3. Again, gussets 20 add strength to the joint.

Also extending rearwardly from the head pipe 12 is a pair of down tubes 22. These tubes extend downwardly and then rearwardly along the bottom sides of the engine 24.

Extending rearwardly from the backbone frame member 14 at approximately the junction between the two segments thereof are a pair of side rails 26. These side rails are supported by a cross member 28 and cooperate with two backstays 30 to form a rearwardly extending structure.

To tie the center frame 18, the down tubes 22 and the backstay 30 together, a pair of connecting bracket assemblies 32 are positioned immediately behind the crankcase of the engine 24. The connecting brackets 32 provide sockets for receipt of these various frame members and in doing so form two parallel junctions for the various frame components of the motorcycle. To provide adequate reinforcement and strength between these parallel frame junctions, a transverse frame member 34 extends between the lower ends of the connecting brackets 32. This transverse frame member 34 cooperates with the U-shaped center frame 18 in providing lateral support for the connecting brackets 32.

Also mounted to the connecting brackets 32 is a rear fork mechanism 36 which in turn supports a rear wheel assembly 38 about an axle 40. The rear fork mechanism 36 includes, as can best be seen in FIG. 2, two rearwardly extending laterally spaced arms 42 and 44 which are fixed to the axle 40. Naturally, sufficient room is provided between the arms 42 and 44 for the placement of the wheel 36 and associated assembly 45. Forwardly of the rear arms 42 and 44 is a rigid transverse frame member 46. This frame member 46 structurally ties the arms 42 and 44 together such that they act as a unit. Forwardly of the rigid transverse frame member 46 are forwardly extending, laterally spaced members 48 and 50. These members extend to define sockets for receipt of pivot mechanisms.

Two pivot mechanisms generally designated 52 and 54 are each fixed to a connecting bracket 32 as can best be seen in FIG. 2. The pivot mechanism 54 includes a pivot pin 56 extending through a sleeve 58 within the left side connecting bracket 32 and through pivot bearings 60 set within the socket of the member 50 of the rear fork assembly 36. The pivot pin 56 is secured by means of a nut 62 held within a bracket 64 fixed to the connecting bracket 32. Dust seals 66 protect the bearings from environmental dirt and the like. The bearings 60 provide thrust resistance and thereby maintain the forwardly extending member 50 axially fixed on the pin 56 and therefore axially fixed relative to the connecting bracket 32.

A second pivot pin 68 on the right pivot mechanism 52 is fixed in a sleeve 70 in turn fixed in the right side connecting bracket 32. Positioned within the socket in the forwardly extending member 48 is a pivot slide bearing 72 for receipt of the pivot pin 64. Again a dust seal 74 is employed to protect the bearing. The slide bearing 72 allows axial movement of the pivot pin 68 relative to the forwardly extending member 48. Thus, the right side pivot mechanism 52 is able to acommodate variations in the width of either the frame itself or the rear fork. This necessarily reduces the cost of high tolerance components.

Between the pivot mechanisms 52 and 54 the rear fork mechanism 36 has been structured so as to create a space as can best be seen in FIG. 2. The rearward most portion of the engine 24 is illustrated in phantom to further show definition of this space. Located through this space is a cushion member 76 which, in the preferred embodiment, acts as both a spring and damping mechanism. A bracket 78 is fixed to the backbone frame member 14 and the center frame 18 to receive a first end of the cushion member 76. This first end is pivotally fixed to the bracket 78 at a pin 80. The cushion member 76 extends downwardly in a direction roughly aligned with the second section of the backbone frame member 14 through the space defined between the pivot mechanisms 52 and 54.

The cushion member 76 is connected at its second, lower end to move upwardly with the rear fork 36. In this way, the cushion member is compressed and is able to resiliently resist and damp the motion of the rear fork 36. This coupling of the lower end of the cushion member 76 to the rear fork 36 is accomplished by means of a linkage mechanism, generally designated 82. This linkage mechanism 82 includes a first link 84 which is pivotally mounted at one end to the rear fork 36. This first link 84 extends downwardly and forwardly to a pin 86 coupling the cushion member 76. A second link 88 is pinned to the first link 84 and to a bracket 90 fixed to the transverse frame member 34. By virtue of the links 84 and 88, the stroke of the cushion member 76 has a rate which increases relative to the rising rate of the rear wheel 38 as the wheel moves upwardly. Thus, increased shock absorbing characteristics can be provided by the linkage mechanism 82.

Thus, a structure is defined for a motorcycle which provides for a cushion member between the pivot mechanism supporting a rear fork mechanism. As can best be seen in FIG. 1, the location of the cushion mechanism and its orientation allow the engine and rear wheel to be placed relatively close together. The dual pivot mechanisms also reduce structural and tolerance requirements. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A structure for a motorcycle having a centrally mounted engine, comprising:
    a head pipe;
    a backbone frame member fixed at a first end to said head pipe and including a first segment extending rearwardly over the engine and second segment depending downwardly behind the engine;
    an inverted U-shaped center frame member fixed to the end of said second segment and having parallel leg portions extending downwardly behind the engine;
    two pivot mechanisms laterally spaced and mounted respectively to the parallel leg portions of said center frame member;
    a rear fork assembly having two forwardly extending, laterally spaced members mounted to said pivot mechanisms to pivotally mount said rear fork assembly on the parallel leg portions of said center frame member and link members connected to said rear fork assembly; and
    a cushion member fixed at a first end to said center frame member and at a second end to said link members to move upwardly with upward pivotal movement of said rear fork assembly and being aligned with said second segment of said backbone frame member, said cushion member extending adjacent to the rearmost portion of the engine and between the parallel leg portions of said center frame member.

2. A structure for a motorcycle having a centrally mounted engine, comprising:
    a frame including a head pipe, a backbone frame and a center frame,
    said backbone frame fixed at a first end to said head pipe and extending rearwardly over the engine,
    said center frame fixed to said backbone frame and having a pair of parallel leg portions extending downwardly behind the engine;
    two pivot mechanisms laterally spaced and mounted respectively to the parallel leg portions of said center frame;
    a rear fork having two forwardly extending, laterally spaced members mounted to said pivot mechanisms to pivotally mount said rear fork on the parallel leg portions of said center frame, said rear fork including two rearwardly extending, laterally spaced arms for supporting a rear wheel through an axle and a transverse frame member connecting said arms at the forward portions thereof and link members connected to said rear fork assembly; and a cushion member fixed at a first end to said center frame member and at a second end to said link members to move upwardly with upward pivotal movement of said rear fork, said cushion member located through a space defined between the rearmost portion of the engine and the transverse frame of said rear fork and extending downwardly to pass between said pivot mechanisms therethrough in substantially aligned relation with and inside the parallel leg portions of said center frame.

* * * * *